April 8, 1924.
R. J. WINSOR
TRAILER COUPLING
Filed Dec. 27, 1921
1,489,293
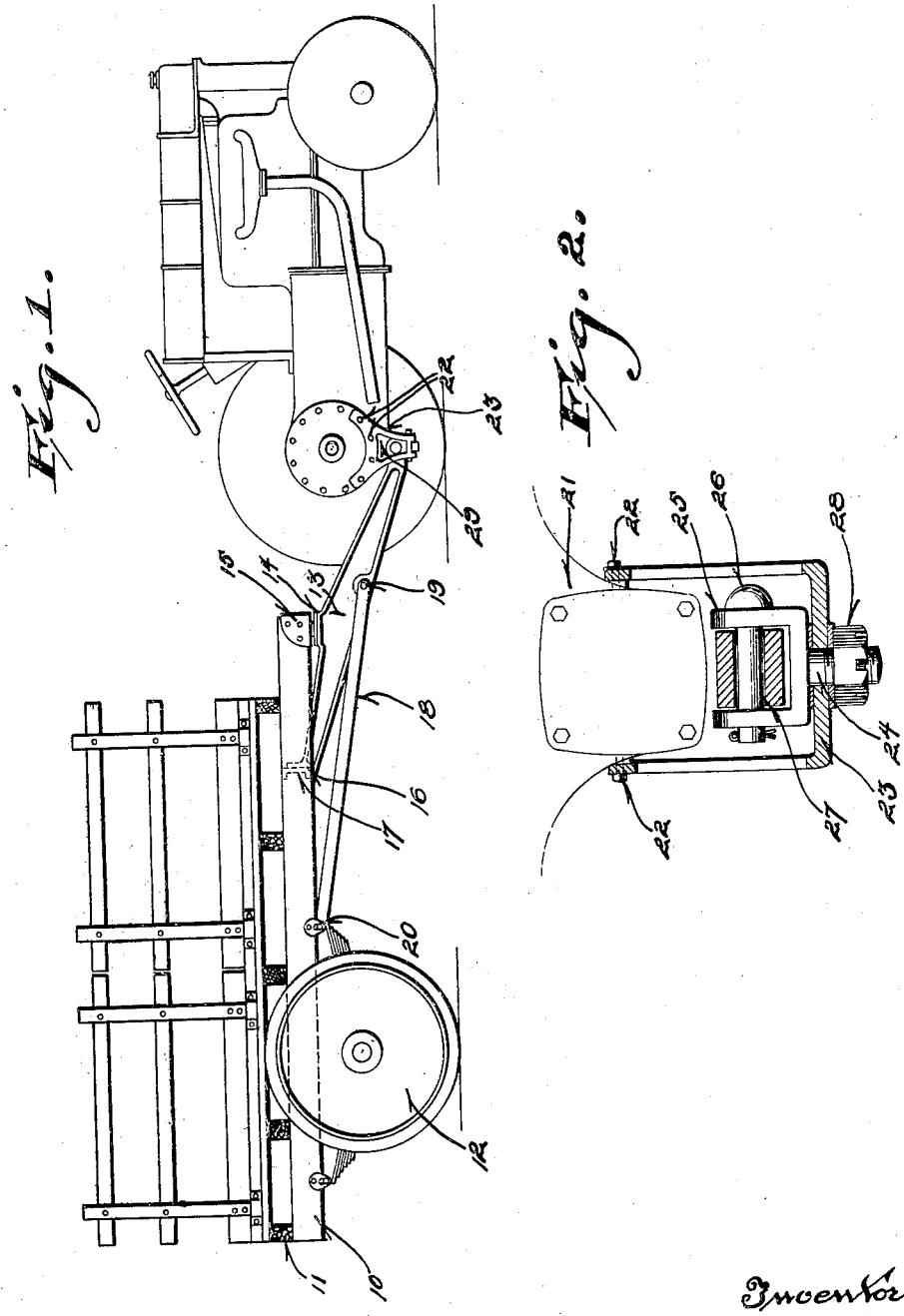

Patented Apr. 8, 1924.

1,489,293

UNITED STATES PATENT OFFICE.

ROY J. WINSOR, OF MILWAUKEE, WISCONSIN, ASSIGNOR TO WEHR CO., OF MILWAUKEE, WISCONSIN, A CORPORATION OF WISCONSIN.

TRAILER COUPLING.

Application filed December 27, 1921. Serial No. 525,001.

*To all whom it may concern:*

Be it known that I, ROY J. WINSOR, a citizen of the United States, and resident of Milwaukee, in the county of Milwaukee and State of Wisconsin, have invented certain new and useful Improvements in Trailer Couplings; and I do hereby declare that the following is a full, clear, and exact description thereof.

My invention relates to trailer structure and the connection of a trailer to a tractor.

Hitherto difficulty has been experienced with trailers because of their tendency to cause the front of the tractor to rise, pivoting about the rear axle.

Again, trouble has been experienced by reason of a lack of traction of the tractor where it has been directed up a steep incline or subjected to the action of an excessively heavy load on the trailer.

My invention aims to provide such a balance of the trailer and to so connect it with the tractor that it will have free universal movement therewith, will tend to stabilize the tractor, eliminating all tendency to rise and will give added traction thereto.

My trailer is forwardly balanced with respect to its two wheels, and is connected beneath the rear housing of the tractor in such wise as to have free universal movement.

Other advantages of my invention are strength of construction and ease of manufacture of parts.

Reference is had to the accompanying drawings, in which—

Figure 1 shows a side elevation of my device, and

Figure 2 shows a cross section through the connection.

Frame 10 of my device is provided with transverse pieces 11 for supporting the load carrying structure. Wheels 12 are positioned rearwardly under the frame 10 so that a substantial portion of the body, and therefore of the load, falls forward of the rear axle. Link 13, which is substantially I shape in cross section, rests at 14 against a supporting piece 15 secured to frame 10 and is secured at 16 against transverse member 17. A brace 18 extending from pivot 19 to lug 20, is positioned on either side of link 13. The differential housing 21 has bolted thereto, at 22, a saddle 23. A pivot pin 24 is rotatable in an aperture in the saddle and provided with lugs 25 apertured to receive pin 26. Link 13 is chambered at 27 to receive pin 26 and has a substantial amount of play thereon to permit free twisting of the trailer with respect to the tractor. Nut 28 maintains pin 24 in proper position. Saddle 23 is cut away at 29 to permit the assembling of link 13 with respect to the trailer.

It is apparent that the saddle 23 may be readily assembled with a tractor, and that link 13 may be placed in position and pin 26 inserted in chamber 27.

I do not limit myself to the precise form of universal joint shown, as link 13 may be bifurcated to receive the ends of a pin and be mounted upon the same pivotally, said pin in turn being pivotally secured to the bottom of the saddle.

The connection being as indicated, below the rear axle, operates to maintain the front of the tractor in contact with the ground by reason of saddle 23 and the body of the tractor operating as a bell crank lever fulcrumed on the rear axle, the rearwardly directed force of the trailer urging the front portion of the tractor downwardly. The structure of the trailer is such that a considerable portion of the weight thereof, which may be as much as one-third of the entire weight of the trailer, or even more, is directed downwardly upon the rear wheels of the tractor through the medium of the connection, thus giving greater traction.

The precise point of the connection has two effects therefore, it assists in giving greater traction, and it prevents the front of the tractor from rising.

While a preferred embodiment of the invention has been illustrated and described, it is to be understood that the present invention is not confined to such specific embodiment, but may be otherwise embodied within the spirit of the invention and the scope of the following claims and it will further be understood that a substantial range of equivalence is contemplated.

I claim:

1. The combination of a trailer having a forwardly extending member, a tractor, and a universal joint connecting said tractor and said forwardly extending member and located substantially under the rear axle of said tractor.

2. The combination of a trailer having two wheels and having a body whose major portion is located forwardly of said wheels, a tractor, and means connecting said tractor and trailer and including a universal joint located substantially under the rear axle of said tractor.

3. In a device of the class described, a tractor, a trailer, two wheels on said trailer near the rear end thereof, said trailer being pivotally connected to said tractor at a point under the rear axle thereof, whereby said trailer will throw a considerable part of its weight on said tractor at a point directly under the rear axle of said tractor.

4. The combination of a trailer, a tractor, a connection between said tractor and said trailer, directly under the rear axle of said tractor, said trailer being balanced to throw its weight on said connection to increase the traction and prevent lifting of the tractor.

5. In a device of the class described, a trailer, a housing, a saddle straddling said housing bolted thereto and directed substantially vertically downwardly therefrom, and a universal joint in said saddle connecting said saddle with said trailer.

6. In a device of the class described, a housing, a saddle secured thereto, a universal connection in said saddle, a link, a trailer body, said link extending from said connection and being secured to said trailer body, a brace secured at one end to said link and at the other end to said trailer body, and wheels on said trailer body.

In testimony that I claim the foregoing I have hereunto set my hand at Milwaukee, in the county of Milwaukee and State of Wisconsin.

R. J. WINSOR.